United States Patent
Zhang et al.

(10) Patent No.: US 10,447,599 B2
(45) Date of Patent: Oct. 15, 2019

(54) PACKET FORWARDING METHOD, SYSTEM, AND APPARATUS

(71) Applicant: Huawei Technologies Co., Ltd., Shenzhen (CN)

(72) Inventors: Bo Zhang, Shenzhen (CN); Xing Tong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/277,820

(22) Filed: Sep. 27, 2016

(65) Prior Publication Data
US 2017/0019336 A1    Jan. 19, 2017

Related U.S. Application Data

(63) Continuation of application No. PCT/CN2015/073788, filed on Mar. 6, 2015.

(30) Foreign Application Priority Data

Mar. 27, 2014 (CN) .......................... 2014 1 0120857

(51) Int. Cl.
    *H04L 12/803* (2013.01)
    *H04L 12/891* (2013.01)
    *H04L 12/64* (2006.01)
    *H04L 12/751* (2013.01)

(52) U.S. Cl.
    CPC ........ *H04L 47/125* (2013.01); *H04L 12/6418* (2013.01); *H04L 45/02* (2013.01)

(58) Field of Classification Search
    CPC ....... H04L 47/125; H04L 47/10; H04L 47/41; H04L 47/788; H04L 69/14
    See application file for complete search history.

(56) References Cited

U.S. PATENT DOCUMENTS

| 6,426,943 B1 * | 7/2002 | Spinney ............. H04L 12/4625 370/235 |
| 6,512,742 B1 | 1/2003 | Alexander, Jr. et al. |
| 6,671,771 B2 | 12/2003 | Perloff |
| 7,821,925 B2 | 10/2010 | Davies |

(Continued)

FOREIGN PATENT DOCUMENTS

| CN | 101827038 A | 9/2010 |
| CN | 102263697 A | 11/2011 |

(Continued)

*Primary Examiner* — Ahmed Elallam
(74) *Attorney, Agent, or Firm* — Leydig, Voit & Mayer, Ltd.

(57) ABSTRACT

A packet forwarding method, system, and apparatus are provided. The method includes: determining that a total number of links is an integral power of 2, wherein the total number of links is a sum of a number of added virtual link and a number of actual links for forwarding a data packet; calculating a hash value of the data packet, and calculating a remainder of the hash value divided by the total number of links; and if the remainder corresponds to a virtual link, calculating another hash value of the data packet, returning back to the step of calculating a remainder, performing the above operations cyclically until the remainder corresponds to an actual link, and forwarding the data packet on the actual link.

16 Claims, 7 Drawing Sheets

(56) References Cited

U.S. PATENT DOCUMENTS

| | | | |
|---|---|---|---|
| 7,898,959 B1* | 3/2011 | Arad | H04L 45/00 370/235 |
| 8,014,278 B1* | 9/2011 | Subramanian | H04L 12/2867 370/229 |
| 2003/0188089 A1 | 10/2003 | Perloff | |
| 2005/0281216 A1* | 12/2005 | Varonen | H04W 8/20 370/328 |
| 2009/0225752 A1 | 9/2009 | Mitsumori | |
| 2013/0028072 A1* | 1/2013 | Addanki | H04L 41/0659 370/218 |
| 2014/0133307 A1 | 5/2014 | Yoshida et al. | |
| 2014/0173129 A1* | 6/2014 | Basso | H04L 12/5689 709/238 |
| 2014/0269268 A1* | 9/2014 | Rao | H04L 47/125 370/229 |

FOREIGN PATENT DOCUMENTS

| | | |
|---|---|---|
| CN | 102447636 A | 5/2012 |
| WO | 2013017017 A1 | 2/2013 |
| WO | WO 2013017017 A1 | 2/2013 |
| WO | 2013073172 A1 | 5/2013 |

* cited by examiner

PACKET FORWARDING METHOD, SYSTEM, AND APPARATUS

CROSS-REFERENCE TO RELATED APPLICATIONS

This application is a continuation of International Application No. PCT/CN2015/073788, filed on Mar. 6, 2015, which claims priority to Chinese Patent Application No. 201410120857.7, filed on Mar. 27, 2014. The disclosures of the aforementioned applications are hereby incorporated by reference in their entireties.

TECHNICAL FIELD

The present application relates to the field of communication technology, and in particular to a packet forwarding method, a packet forwarding system and a packet forwarding device.

BACKGROUND

With the development of cloud technology, the amount of data to be transmitted and processed becomes increasingly great, and a bandwidth required by a network device and a user device is increased. How to improve the network bandwidth to meet the requirement of the user device becomes an urgent issue to be solved. Presently, the network bandwidth is improved mainly in the following two manners. In a first manner, a processing capability of a single physical link is improved, for example using a chip with a better processing performance and an optical fiber with a better transmission performance. In a second manner, a load is shared by multiple low-speed physical devices and multiple low-speed links, to improve the overall processing and transmission capability. As compared with the first manner, the second manner has obvious advantages in reliability and extensibility. Thus, the technology using the second manner is widely applied to the present network, which may be referred to as "load sharing (LS)" or "load balancing (LB)".

According to a load sharing method in the prior art, a link for transmitting a data packet is determined by performing a certain calculation on a part of information of the data packet, for example, performing a remainder operation on a hash value of the part of information divided by the number of actual physical links. However, in this manner, if the number of the actual physical links is not an integral power of 2, the "load sharing" has a great deviation due to the remainder operation, and thus the traffic can not be distributed uniformly. If the traffic is not distributed uniformly, for example, a link reaches a full load, a packet on the link may be lost if the traffic is increased continuously, and thereby influencing a service.

SUMMARY

A packet forwarding method, a packet forwarding system and a packet forwarding device are provided according to embodiments of the present application, so as to distribute traffic uniformly and reduce influence on a service.

In a first aspect, a packet forwarding method is provided according to an embodiment of the present application, which includes:

determining that a total number of links is an integral power of 2, where the total number of links is a sum of a number of added virtual link and a number of actual links for forwarding a data packet;

calculating a hash value of the data packet, and calculating a remainder of the hash value divided by the total number of links; and if the remainder of the hash value divided by the total number of links corresponds to a virtual link, calculating another hash value of the data packet, returning back to the step of calculating a remainder, performing the above operations cyclically until a remainder of a hash value divided by the total number of links of the data packet corresponds to an actual link, and forwarding the data packet on the actual link; or if the remainder of the hash value divided by the total number of links corresponds to a virtual link, calculating a remainder of the hash value divided by a number of actual links of the data packet, and forwarding the data packet on an actual link corresponding to the remainder of the hash value divided by the number of the actual links; and if the remainder of the hash value divided by the total number of links corresponds to an actual link, forwarding the data packets in the actual link.

In a first possible implementation of the first aspect of the embodiment of the present application, the calculating a hash value of the data packet may include:

extracting a part of fields from the data packet; and performing cyclic redundancy check on a byte sequence formed by the extracted part of fields, to calculate the hash value.

In a second aspect, a packet forwarding device is provided according to an embodiment of the present application, which includes:

a link determining unit configured to determine that a total number of links is an integral power of 2, where the total number of links is a sum of a number of added virtual link and a number of actual links for forwarding a data packet;

a remainder calculation unit configured to calculate a hash value of the data packet and calculate a remainder of the hash value divided by the total number of links, where the total number of links is determined by the link determining unit; and a notifying unit configured to notify the remainder calculation unit of a calculation of another hash value of the data packet and of a calculation of a remainder of the another hash value divided by total number of links, if a remainder of a hash value divided by the total number of links obtained by the remainder calculation unit corresponds to a virtual link; and a forwarding unit configured to forward the data packet on an actual link, when the remainder calculation unit and the notifying unit perform the above operations cyclically until a remainder of a hash value divided by the total number of links of the data packet corresponds to an actual link, or a notifying unit configured to notify that the remainder calculation unit calculates a remainder of the hash value divided by a number of actual links of the data packet, if a remainder of a hash value divided by the total number of links obtained by the remainder calculation unit corresponds to a virtual link; and a forwarding unit configured to forward the data packet on an actual link corresponding to the remainder of the hash value divided by the number of the actual links, where the remainder is obtained by the remainder calculation unit; and the forwarding unit further configured to forward the data packet on an actual link, if the remainder, obtained by the remainder calculation unit, of the hash value divided by the total number of links corresponds to the actual link.

In a first possible implementation of the second aspect of the embodiment of the present application, the remainder calculation unit may be configured to extract a part of fields from the data packet, and perform cyclic redundancy check on a byte sequence formed by the extracted part of fields to calculate the hash value.

In a third aspect, a packet forwarding method is provided according to an embodiment of the present application, which includes:

determining that a total number of links is an integral power of 2, where the total number of links is a sum of a number of added virtual link and a number of virtual sublinks formed by extending actual links for forwarding a data packet;

calculating a hash value of the data packet, and calculating a remainder of the hash value divided by the total number of links; and if the remainder of the hash value divided by the total number of links corresponds to a virtual link, calculating another hash value of the data packet, returning back to the step of calculating a remainder, performing the above operations cyclically until a remainder of a hash value divided by the total number of links of the data packet corresponds to one of virtual sublinks of an actual link, and forwarding the data packet on the actual link; or if the remainder of the hash value divided by the total number of links corresponds to a virtual link, calculating a remainder of hash value of the data packet divided by the number of virtual sublinks, and forwarding the data packet on an actual link extended to form a virtual sublink corresponding to the remainder of the hash value divided by the number of virtual sublinks.

In a first possible implementation of the third aspect of the embodiment of the present application, the method may further include:

if the remainder of the total number of the links divided by the hash value corresponds to one of the virtual sublinks, forwarding the data packet on the actual link extended to form the one of the virtual sublinks.

With reference to the third aspect of the embodiment of the present application or the first possible implementation of the third aspect, in a second possible implementation of the third aspect of the embodiment of the present application, before the determining that the total number of links is an integral power of 2, the method may further include:

determining a number of virtual sublinks to be formed by extending each of the actual links for forwarding a data packet;

multiplying the determined number of virtual sublinks by the number of actual links to obtain a product, and determining an adding value which is added to the product to obtain an integral power of 2; and if the adding value is less than a preset value, using the adding value as the number of virtual link(s) to be added; if the adding value is greater than the preset value, returning back to determine another number of virtual sublinks formed by extending each of the actual links and determining an adding value for the another number of virtual sublinks, where the determining that the total number of links is an integral power of 2 may include: determining that the total number of links is a sum of the product and the adding value.

With reference to the third aspect of the embodiment of the present application or the first possible implementation of the third aspect, in a third possible implementation of the third aspect of the embodiment of the present application, the calculating a hash value of the data packet may include:

extracting a part of fields from the data packet; and performing cyclic redundancy check on a byte sequence formed by the extracted part of fields, to calculate the hash value.

In a fourth aspect, a packet forwarding device is provided according to an embodiment of the present application, which includes:

a link determining unit configured to determine that a total number of links is an integral power of 2, where the total number of links is a sum of a number of added virtual link and a number of virtual sublinks formed by extending actual links for forwarding a data packet;

a remainder calculation unit configured to calculate a hash value of the data packet, and calculate a remainder of the hash value divided by the total number of links, where the total number of links is determined by the link determining unit; and a notifying unit configured to notify the remainder calculation unit of a calculation of another hash value of the data packet and of a calculation of a remainder of the another hash value divided by total number of links, if the remainder, obtained by the remainder calculation unit, of the hash value divided by the number of links corresponds to a virtual link; and a forwarding unit configured to forward the data packet on an actual link, when the remainder calculation unit and the notifying unit perform the above operations cyclically until a remainder of a hash value divided by the total number of links of the data packet corresponds to one of the virtual sublinks of the actual link; or a notifying unit configured to notify the remainder calculation unit of a calculation of a remainder of the hash value of the data packet divided by the number of virtual sublinks, when the remainder, obtained by the remainder calculation unit, of the hash value divided by the number of links corresponds to a virtual link; and a forwarding unit configured to forward the data packet on an actual link extended to form a virtual sublink corresponding to the remainder of the hash value divided by the number of virtual sublinks, where the remainder is obtained by the remainder calculation unit.

In a first possible implementation of the fourth aspect of the embodiment of the present application, the forwarding unit may be further configured to forward the data packet on an actual link corresponding to one of the virtual sublinks, if the remainder, obtained by the remainder calculation unit, of the hash value divided by the total number of links corresponds to the one of the virtual sublinks.

With reference to the fourth aspect of the embodiment of the present application or the first possible implementation of the fourth aspect, in a second possible implementation of the fourth aspect of the embodiment of present application, the link determining unit may be further configured to determine the number of virtual sublinks formed by extending each of the actual links for forwarding a data packet; multiply the determined number of virtual sublinks by the number of actual links to obtain a product and determine an adding value which is added to the product to obtain the integral power of 2; and if the adding value is less than a preset value, use the adding value as the number of virtual link(s) to be added and determine that the total number of links is a sum of the product and the adding value; if the adding value is greater than a preset value, return back to a determination of another number of virtual sublinks formed by extending each of the actual links and determine an adding value for the another number of the virtual sublinks.

With reference to the fourth aspect of the embodiment of the present application or the first possible implementation of the fourth aspect, in a third possible implementation of the fourth aspect of the embodiment of the present application, the remainder calculation unit may be configured to extract a part of fields from the data packet; and perform cyclic redundancy check on a byte sequence formed by the extracted part of fields, to calculate the hash value.

In a fifth aspect, a packet forwarding system is provided according to an embodiment of the present application, which includes a first communication device and a second communication device, where there are multiple actual links between the first communication device and the second communication device; and the first communication device is the packet forwarding device according to the second aspect of the embodiment of the present application, or the first possible implementation of the second aspect, or the fourth aspect of the embodiment of the present application, or any one of the first to the third possible implementations of the fourth aspect.

In a sixth aspect, a packet forwarding system is provided according to an embodiment of the present application, the packet forwarding system includes a first communication device and multiple second communication devices, where there is one actual link between the first communication device and each of the multiple second communication devices; and the first communication device is the packet forwarding device according to the second aspect of the embodiment of the present application, or the first possible implementation of the second aspect, or the fourth aspect of the embodiment of the present application, or any one of the first to the third possible implementations of the fourth aspect.

In one case of the embodiments of the present application, the communication device calculates the remainder of hash value of the data packet divided by the determined total number of links. A total number of links is an integral power of 2, which may be a sum of the number of added virtual link and the number of actual links for forwarding the data packet. If the remainder of the hash value divided by the total number of links corresponds to a virtual link, another hash value of the data packet is calculated and the process is returned back to the step of calculating a remainder based on the another hash value and the total number of links; perform the above operations cyclically, a remainder of a hash value of the data packet divided by a decreased total number of links corresponds to an actual link. Then, the data packet is forwarded in the actual link. Alternatively, if the remainder of the hash value divided by the total number of links corresponds to a virtual link, a remainder of the hash value divided by a number of actual links of the data packet is calculated and the data packet is forwarded in an actual link corresponding to the remainder. In this way, the data packet can be forwarded in a certain actual link by adding a virtual link and calculating the remainder, such that the data packets can be uniformly distributed to actual links as much as possible, and thereby distributing the traffic uniformly, and reducing the influence on a service.

In another case of the embodiments of the present application, the communication device calculates the remainder of hash value of the data packet divided by the determined total number of links. The total number of the links is an integral power of 2, which may be a sum of a number of added virtual link and a number of virtual sublinks formed by extending an actual link for forwarding the data packet. If the remainder of the hash value divided by the total number of the links corresponds to a virtual link, another hash value of the data packet is calculated and the process is returned back to the step of calculating a remainder based on the another hash value; perform the above operations cyclically, until a remainder of a hash value of the data packet divided by a decreased total number of the links corresponds to one of the virtual sublinks formed to extend the actual link. Then, the data packet is forwarded in the actual link. Alternatively, if the remainder of the hash value divided by the total number of the links corresponds to a virtual link, the remainder of the hash value divided by the number of all virtual sublinks formed by extending the actual links is calculated, and the data packet is forwarded in the actual link extending to forming a virtual sublink corresponding to the remainder. In this way, an actual link are extended into virtual sublinks, a virtual link is added and the remainder is calculated, such that the data packet can finally be forwarded in a certain actual link and the data packets can be uniformly distributed to the actual links as much as possible, and thereby distributing the traffic uniformly and reducing the influence on a service.

BRIEF DESCRIPTION OF THE DRAWINGS

To describe the technical solutions in the embodiments of the present application or the prior art more clearly, the following briefly introduces the accompanying drawings required for describing the embodiments. Apparently, the accompanying drawings in the following description show merely some embodiments of the present application or the prior art, and a person of ordinary skill in the art may still derive other drawings from these accompanying drawings without creative efforts.

DETAILED DESCRIPTION OF EMBODIMENTS

Hereinafter technical solutions of embodiments of the present application are described clearly and completely in conjunction with the drawings of the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

Figure 1A:
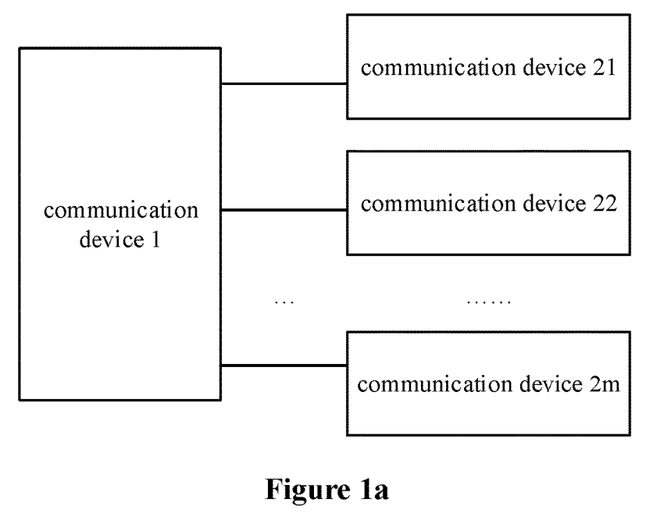
FIG. 1a and FIG. 1b are schematic structural diagrams of communication systems according to an embodiment of the present application.
Figure 1B:
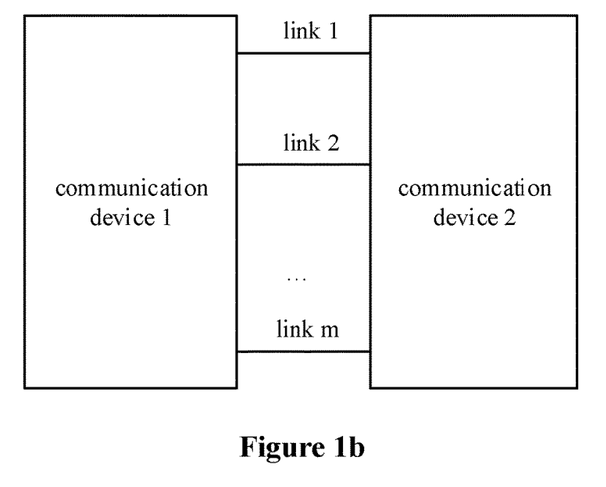
Figure 2A:
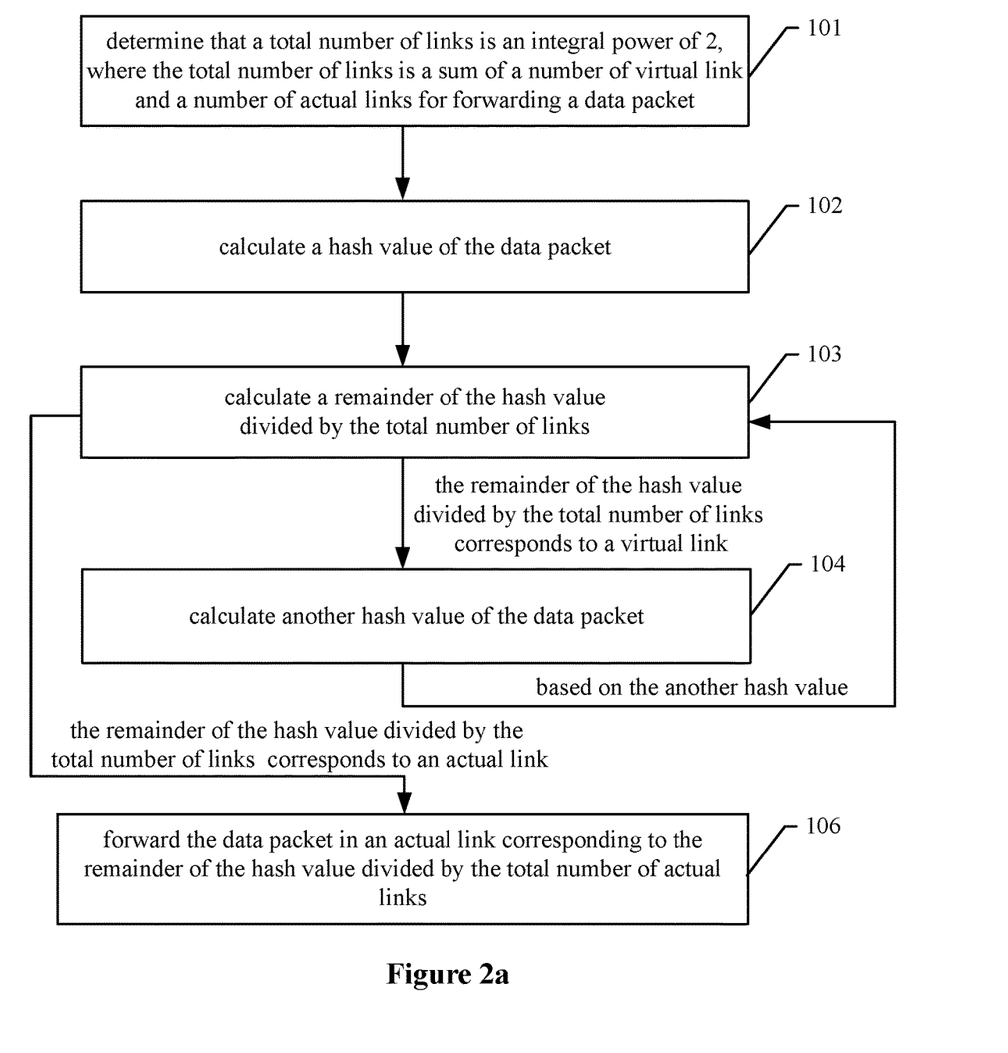
FIG. 2a and FIG. 2b are flowcharts of two packet forwarding methods according to an embodiment of the present application.
Figure 2B:
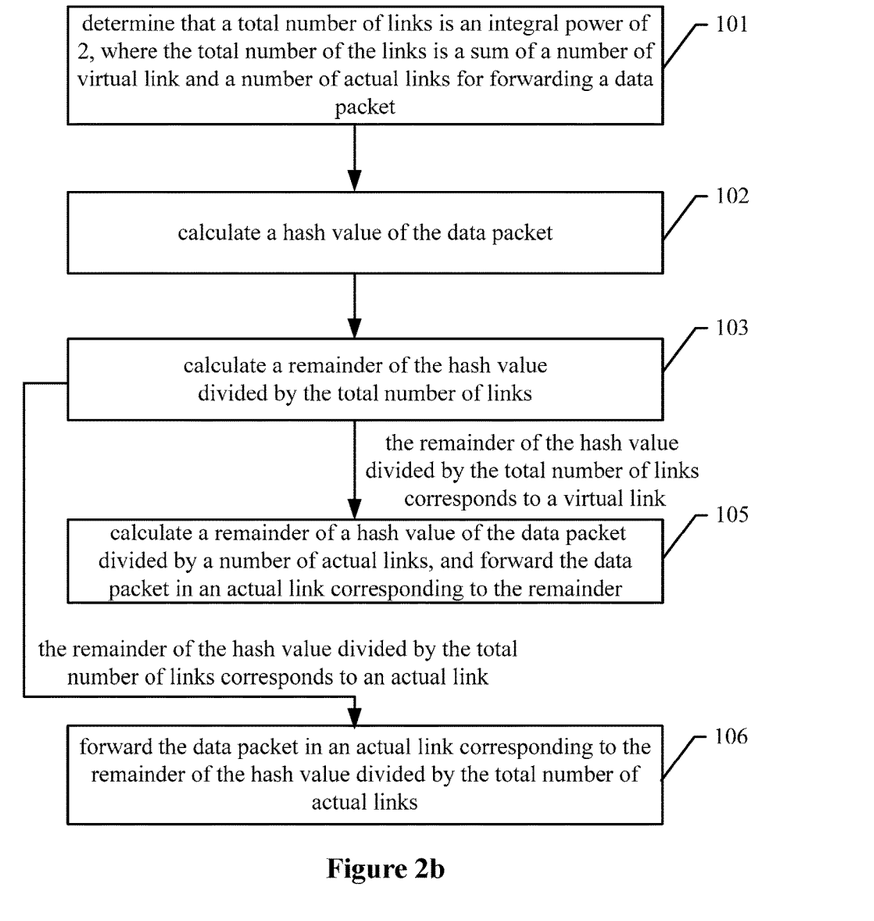

A packet forwarding method is provided according to an embodiment of the present application, which may be mainly applied to a communication system shown in FIG. 1a or FIG. 1b. The communication system shown in FIG. 1a includes a communication device 1 and multiple communication devices 2 (i.e., a communication device 21 to a communication device 2m in FIG. 1a), and the communication device 1 is connected to the multiple communication devices 2 via different links. The communication system shown in FIG. 1b includes a communication device 1 and a communication device 2, and the communication device 1 may communicate with the communication device 2 via multiple links (for example m links). The method according to the embodiment is performed by the communication device 1 of the communication system shown in FIG. 1a or FIG. 1b. The method mainly aims at a case that the number of actual links for forwarding a data packet is not an integral power of 2. Flowcharts of the method are shown in FIG. 2a and FIG. 2b, and the method includes the follows.

In step 101, it is determined that a total number N of links is an integral power of 2, where the total number N of links is a sum of a number P of virtual link(s) and the number M of actual links for forwarding a data packet.

It should be understood that, once receiving a data packet, a communication device (for example the communication device 1) needs to determine which link is used to forward the data packet, and then forwards the data packet. In the embodiment, in a process of determining the link for forwarding the data packet, if the number of actual links, on which the communication device forwards the packet, is an integral power of 2, a remainder of a hash value of the data packet divided by the number of actual links is calculated to determine the link. If the number of actual links, on which the communication device forwards the packet, is not an integral power of 2, the total number of links, one of which are used to forward the data packet, is determined before the above step. Specifically, P virtual link may be added based on the actual links, such that a sum of the number P of virtual link(s) and the number M of actual links equals to an integral power of 2.

In order to facilitate subsequent calculation, the communication device may number the actual links and the virtual link. For example, from the actual links to the virtual links, the links may be numbered as 0, 1, 2, . . . , N−1.

In step 102, a hash value of the data packet is calculated.

In step 103, a remainder of the hash value calculated in step 102 divided by the total number N of links is calculated.

Specifically, the communication device may extract a part of fields from the data packet firstly, for example extracting multiple fields from a head of the data packet, such as a quintuple (i.e., a source IP address, a target IP address, a source port, a target port and a protocol number). For another packets for example a tunnel packet, the communication device may not only extract a quintuple from an external layer of the tunnel packet, but also extract the other field from an internal layer of the tunnel packet as a supplementary field. Then, the extracted part of fields is arranged in a certain order, to form a byte sequence, and cyclic redundancy check (Cyclic redundancy check, CRC) is performed on the byte sequence to calculate the hash value.

After obtaining the hash value, the communication device may perform a remainder calculation on the total number N of links using the hash value, i.e., calculating a remainder of the hash value divided by the total number N of links. If the remainder of the hash value divided by the total number of links corresponds to a virtual link, step 104 is performed as shown in FIG. 2a, or step 105 is performed as shown in FIG. 2b. If the remainder of the hash value divided by the total number N of links corresponds to an actual link, step 106 is performed, i.e., the data packet is forwarded in the actual link. The remainders of a first hash value divided by the total number N of links include 0, 1, 2, . . . , and N−1. In combination with link numbers described above, if the remainder is the same as a link number, the communication device determines that the remainder corresponds to the link. When the remainder of the hash value divided by the total number of links corresponds to a virtual link, the above operations need to be performed cyclically, and thereby increasing the amount of calculation. In order to reduce the amount of calculation as much as possible, the embodiment shown in FIG. 2b may be adopted.

In step 104, another hash value of the data packet is calculated; the process returns back to step 103 based on the another hash value, i.e., a remainder of the another hash value divided by the total number N of the links is calculated, until a remainder of a certain hash value of the data packet divided by the total number of the links corresponds to an actual link; and the data packet is forwarded in the actual link.

It should be noted that, the manner for calculating another hash value in step 104 is similar to that for calculating the hash value in step 102. The two hash values each are obtained based on a sequence formed by a part of fields in the data packet. However, in calculating the two hash values, different fields may be extracted from the data packet, or different hash calculation methods may be used for the sequences formed by the extracted fields.

In step 105, a remainder of a hash value of the data packet divided by a number of actual links of the data packet is calculated. Since the remainder of the hash value divided by a number of actual links corresponds to a certain actual link, the communication device forwards the data packet on an actual link corresponding to the remainder of the hash value divided by a number of actual links. Here, the hash value of the data packet may be the same as or different from the hash value for calculating the remainder in step 103. Specifically, in this step, the hash value calculated in step 102 may be directly used as the hash value for calculating the remainder in step 105; other fields may be extracted from the data packet and hash calculation is performed to obtain another hash value; or another different hash value is obtained using another hash calculation method based on the fields extracted in step 102 of calculating the hash value.

In addition, it should be noted that, in order to avoid cycles from step 101 to step 104 too many times, in a specific embodiment, if the remainder of the hash value divided by the total number of links still corresponds to the virtual link after the times of cycles from step 101 to step 104 exceeds a preset value, the communication device continues to perform the step 105.

In the embodiment of the present application, the communication device calculates the remainder of hash value of the data packet divided by the determined total number of links. A total number of links is an integral power of 2, which may be a sum of the number of added virtual link and the number of actual links for forwarding the data packet. If the remainder of the hash value divided by the total number of links corresponds to a virtual link, another hash value of the data packet is calculated, the process returns back to the step of calculating a remainder based on the another hash value. Perform the above operations cyclically until a remainder of a hash value of the data packet divided by a decreased total number of links corresponds to an actual link, and the data packet is forwarded on the actual link. Alternatively, if the remainder of the hash value divided by the total number of links corresponds to a virtual link, a remainder of the hash value divided by a number of actual links of the data packet is calculated, and the data packet is forwarded on the actual link corresponding to the remainder. In this way, a virtual link is added and the remainder is calculated, such that the data packet can be finally forwarded on a certain actual link and the data packets can be uniformly distributed to the actual links as much as possible, and thereby distributing the traffic uniformly, and reducing the influence on a service.

Figure 3:
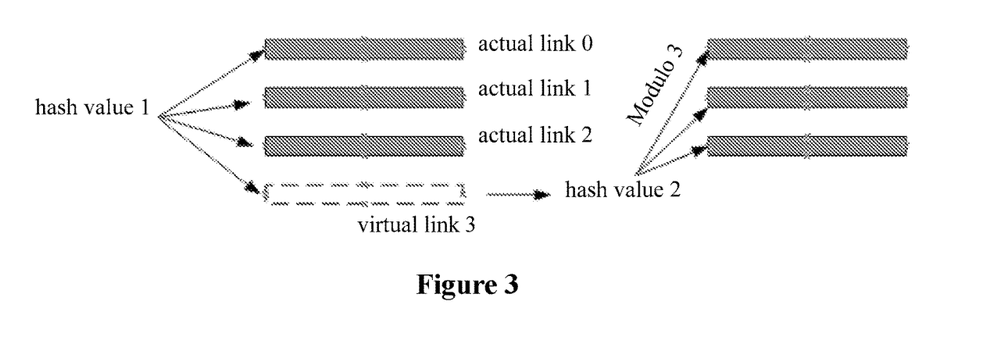
FIG. 3 is a schematic diagram showing a process of determining which actual link forwards a data packet according to an application embodiment of the present application.

As shown in FIG. 3, the packet forwarding method shown in FIG. 2b is illustrated using a specific embodiment hereinafter. In the embodiment, the number of actual links (a block filled with a gray color indicates an actual link in FIG. 3), on which the communication device forwards a data packet, is 3; and one virtual link (a dotted line block indicates a virtual link in FIG. 3) may be added, such that a sum of the number of actual links and the number of virtual link(s) equals to 4, i.e., an integral power of 2. These links are numbered from 0 to 3.

Firstly, when receiving a data packet, the communication device may extract a quintuple from the data packet. CRC is performed on a byte sequence formed by arranging the quintuple, to calculate a hash value 1. A remainder of the hash value 1 divided by total number of links, which equal to 4, is calculated. In a case that the obtained remainder is between 0 and 2, the data packet is forwarded in a respective actual link, due to 0 to 2 corresponding to the actual links numbers respectively.

Secondly, in a case that the remainder is 3, another remainder needs to be calculated due to 3 corresponding to the virtual link number. Specifically, another part of fields may be extracted from the data packet to obtain a hash value 2. A remainder of the hash value divided by a number of actual links 2 is calculated to obtain a remainder between 0 and 2. The remainder between 0 and 2 corresponds to a certain actual link number certainly. The data packet is forwarded in the respective actual link. In other embodiments, the original hash value 1 or another newly calculated hash value 2 may be used to calculate the remainder on the number of actual links.

Figure 4A:
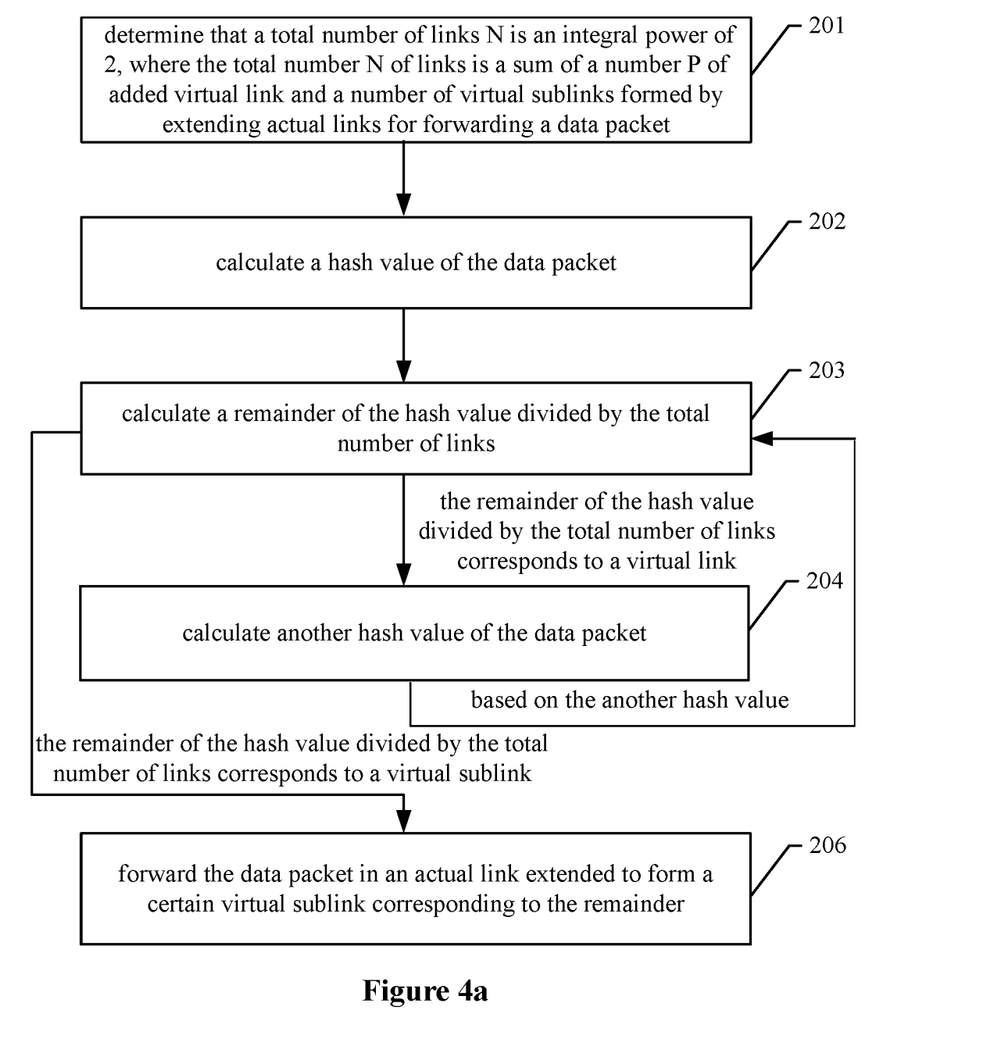
FIG. 4a and FIG. 4b are flowcharts of other two packet forwarding methods according to an embodiment of the present application.
Figure 4B:
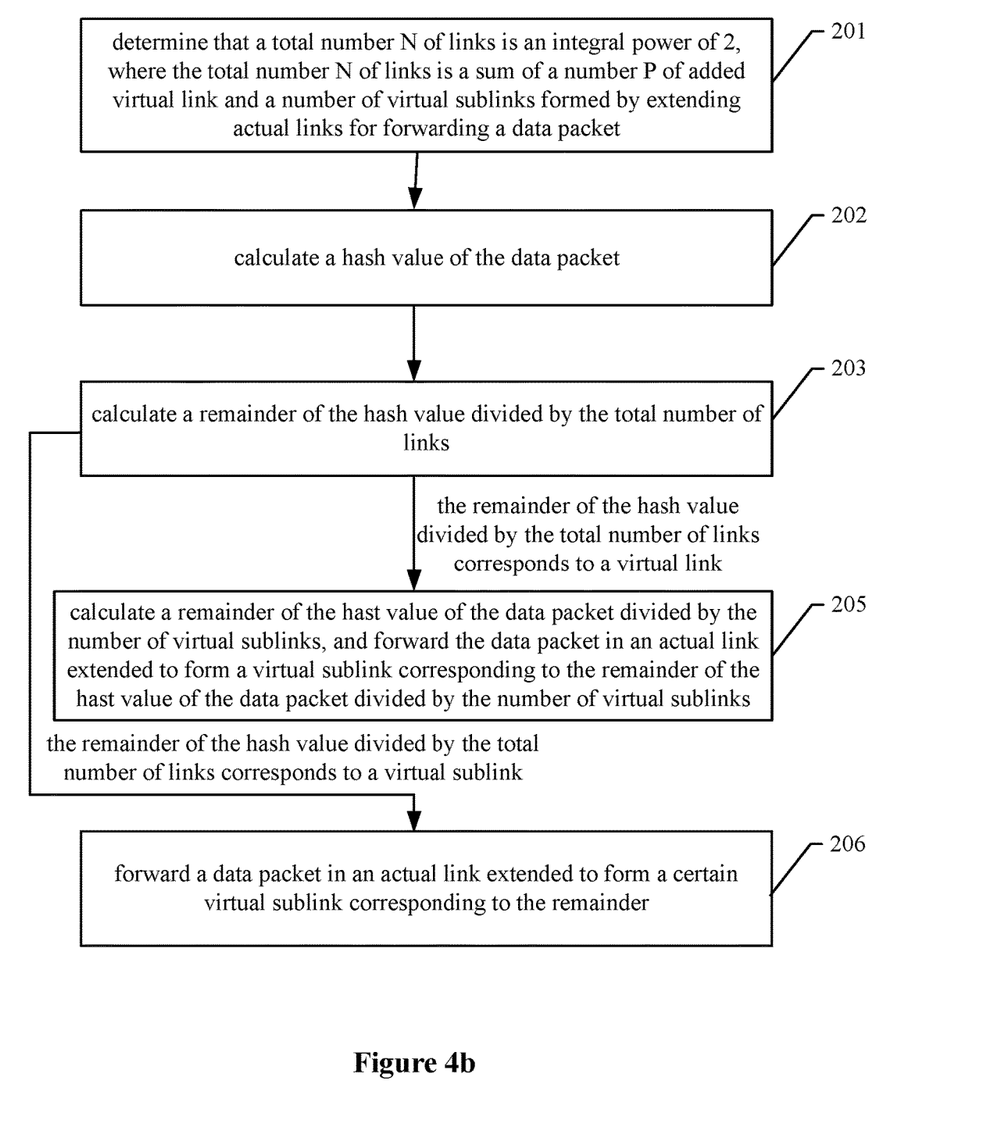

Another packet forwarding method is provided according to an embodiment of the present application, which may be mainly applied to the communication system shown in FIG. 1a or FIG. 1b. The method according to the embodiment of the present application is performed by the communication device 1 of the communication system shown in FIG. 1a or FIG. 1b. The method mainly aims at a case that the number of actual links for forwarding a data packet is not an integral power of 2. As shown in FIG. 4a and FIG. 4b, the method includes the follows.

In step 201, it is determined that a total number N of links is an integral power of 2, where the total number N of links is a sum of a number P of added virtual link and a number of virtual sublinks formed by extending actual links for forwarding a data packet.

It should be understood that, once receiving a data packet, a communication device (for example the communication device 1) needs to determine which link is used to forward the data packet, and then forwards the data packet. In the embodiment, in a process of determining the link for forwarding the data packet, if the number of actual links, on which the communication device forwards the packet, is not an integral power of 2, the total number of links, one of which are used to forward the data packet, is determined firstly. Specifically, multiple actual links each are extended, i.e., each of the multiple actual links is extended into multiple virtual sublinks, for example each actual link is extended into three virtual sublinks. Then, P virtual link is added based on the virtual sublinks, such that a sum of the number of virtual sublinks formed by extending all the actual links (i.e., the number of all the extended virtual sublinks) and the number of the virtual link is an integral power of 2. It should be noted that, in extending the actual links, each actual links need to be extended, and the numbers of virtual sublinks formed by extending different actual links are the same.

Before determining the total number of links, the communication device may determine a number of virtual sublinks to be formed by extending each actual link and the number of virtual link(s) to be added. In a specific embodiment, the communication device may perform the operation in the following method.

Firstly, the number of virtual sublinks to be formed by extending each actual link for forwarding the data packet is determined. For example, an initial value is determined; then the determined number of virtual sublinks is multiplied by the number of actual links to obtain a product. An adding value is determined, which is added to the product to obtain an integral power of 2. If the adding value is less than a preset value (for example 3 or 2), the adding value is used as the number of virtual link(s) to be added, and it is determined that the total number of links is a sum of the product and the adding value. It should be understood that, if the adding value is greater than a preset value, another number of virtual sublinks to be formed by extending each actual link is determined, and the adding value is determined for the another number of virtual sublinks. Then, the adding value, which obtained based on the another number of virtual sublinks, is compared with the preset value; and corresponding processing is performed based on the comparison result. The above operations are performed cyclically, until the obtained adding value is less than the preset value. In order to facilitate subsequent calculation, the communicate device may number the virtual sublinks of the actual links, and the virtual link. For example, from the virtual sublinks of the actual links to the virtual link, the links are numbered as 0, 1, 2, . . . , and N−1; and the actual links are numbered from 0 to M−1.

In step 202, a hash value of the data packet is calculated.

In step 203, a remainder of the hash value calculated in step 202 divided by the total number N of links is calculated.

Specifically, the communication device may extract a part of fields from the data packet firstly, for example a quintuple (i.e., a source IP address, a target IP address, a source port, a target port and a protocol number); then arrange the extracted part of fields in a certain order, to form a byte sequence; and perform cyclic redundancy check on the byte sequence to calculate the hash value.

After obtaining the hash value, the communication device may perform a remainder calculation on the total number N of links using the hash value. If the remainder of the hash value divided by the total number of links corresponds to a virtual link, step 204 is performed as shown in FIG. 4a, or step 205 is performed as shown in FIG. 4b. If the remainder of the hash value divided by the total number N of links corresponds to a virtual sublink, step 206 is performed. The remainders of the hash value divided by the total number N of the links include 0, 1, 2, . . . , and N−1. In combination with virtual sublink numbers and a virtual link number described above, if the remainder is the same as one of the virtual sublink numbers or a virtual link number, the communication device determines that the remainder corresponds to a certain virtual sublink or a certain virtual link.

In step 204, another hash value of the data packet is calculated, and the process returns back to step 203 based on the another hash value. That is, in performing the step 203, a remainder of the another hast value divided by the total number of links is calculated, until a remainder of a hash value divided by the total number of links corresponds to a certain virtual sublink of an actual link. Then, the data packet is forwarded in a corresponding actual link.

It should be noted that, the manner for calculating another hash value in step 204 is similar to that for calculating the hash value in step 202. The two hash values each are obtained based on a sequence formed by a part of fields in the data packet. In calculating the two hash values, different fields may be extracted from the data packet, or different hash calculation methods may be used for the sequences formed by the extracted fields.

In step 205, a remainder of the hast value of the data packet divided by the number of virtual sublinks, i.e., the number of all virtual sublinks formed by extending all the actual links, is calculated, and the data packet is forwarded in an actual link extended to form a virtual sublink corresponding to the remainder of the hast value divided by the number of virtual sublinks. Here, the hash value of the data packet may be the same as or different from the hash value for calculating the remainder in step 203. Specifically, in this step, the communication device newly extracts another part of fields from the data packet and hash calculation is performed to obtain another hash value, or calculates another hash value using another hash value calculation method based on the fields extracted in step 202 of calculating the hash value.

In addition, it should be noted that, in order to avoid cycles from step 201 to step 204 too many times, in a specific embodiment, if the remainder of the hash value divided by the total number of links still corresponds to the virtual link after the times of cycles from step 101 to step 104 exceeds a preset value, the communication device continues to perform step 205.

In step 206, the data packet is forwarded in an actual link corresponding to a certain virtual sublink. If the remainder corresponds to the certain virtual sublink, in a process of determining the actual link corresponding to the certain virtual sublink, the remainder obtained in step 202 is divided by the number of virtual sublinks formed by extending one actual link to obtain a quotient, and the integral part of the quotient corresponds to a certain actual link number, and thereby obtaining the actual link corresponding to the virtual sublink.

It should be noted that, in the embodiment shown in FIG. 2a and FIG. 2b, a virtual link needs to be added based on the actual links, such that a sum of the number of actual links and the number of virtual link is an integral power of 2. However, if the number of virtual links to be added is great, the amount of calculation will be increased. In order to reduce the amount of calculation as much as possible, the method according to the embodiment shown in FIG. 4a or FIG. 4b may be adopted.

In the embodiment, the communication device calculates the remainder of hash value of the data packet divided by the determined total number of links. A total number of links is an integral power of 2, which may be a sum of a number of added virtual link and a number of virtual sublinks formed by extending actual links for forwarding the data packet. If the remainder of the hash value divided by the total number of links corresponds to a virtual link, another hash value of the data packet is calculated and the process returns back to the step of calculating a remainder based on the another hash value. Perform the above operations cyclically until a remainder of a hash value of the data packet divided by a decreased total number of links corresponds to a certain virtual sublink of an actual link, and the data packet is forwarded on the actual link. Alternatively, if the remainder of the hash value divided by the total number of the links corresponds to a virtual link, a remainder of the hash value of the packet divided by the number of all the virtual sublinks of the actual links is calculated, and the data packet is forwarded on an actual link extended to form a virtual sublink corresponding to the remainder. In this way, the actual links are extended into the virtual sublinks, a virtual link is added and the remainder is calculated, such that the data packet can finally be forwarded on a certain actual link and the data packets can be uniformly distributed to actual links as much as possible, and thereby distributing the traffic uniformly and reducing the influence on a service.

Figure 5:
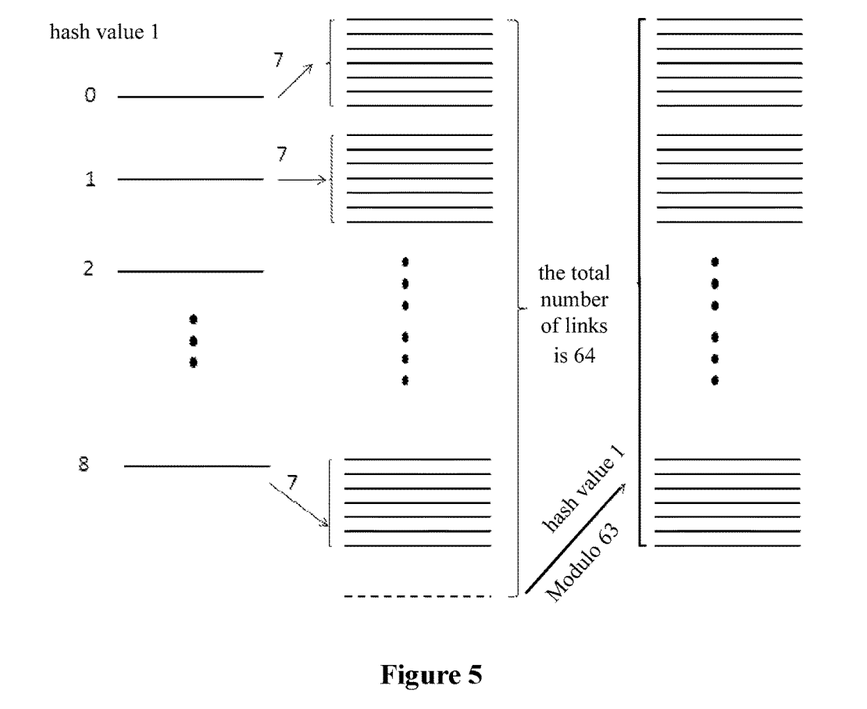
FIG. 5 is a schematic diagram showing another process of determining which actual link forwards a data packet according to an application embodiment of the present application.

As shown in FIG. 5, the packet forwarding method shown in FIG. 4b is described using a specific embodiment hereinafter. In the embodiment, the number of actual links (indicated by solid lines), on which the communication device forwards a data packet, is 9; and the actual links are numbered from 0 to 8. Each actual link is extended into seven virtual sublinks, and then one virtual link (indicated by a dotted line) needs to be added, such that a sum of the number of virtual sublinks and the number of virtual link equals to 64, i.e., an integral power of 2. These links are numbered from 0 to 63.

Firstly, when receiving a data packet, a communication device may extract a quintuple from the data packet. CRA is performed on a byte sequence formed by arranging the quintuple, to calculate a hash value 1. A remainder of the hash value 1 divided by the total number of the links, which equal to 64, is calculated. In a case that the obtained hash value is between 0 and 62, due to 0 to 62 corresponding to the virtual sublink numbers of the actual links respectively, the remainder is divided by the number of virtual sublinks, which is equal to 7, formed by extending one actual link, to obtain an integral part of a quotient; the integral part may correspond to a certain actual link number. Then, the data packet is forwarded in the corresponding actual link.

Secondly, in a case that the remainder is 63, another remainder needs to be calculated due to 63 corresponding to the virtual link number. Specifically, another part of fields may be extracted from the data packet to obtain a hash value 2. A remainder of the hash value 2 divided by the number of virtual sublinks, which is equal to 63, is calculated to obtain a remainder between 0 and 62. The remainder corresponds to a number of a certain virtual sublink of a certain actual link certainly, and then a corresponding actual link is determined. The data packet is forwarded on the determined actual link. In other embodiments, the original hash value 1 or another newly calculated hash value 2 may be used to calculate a remainder against a decreased total number of links.

Figure 6:
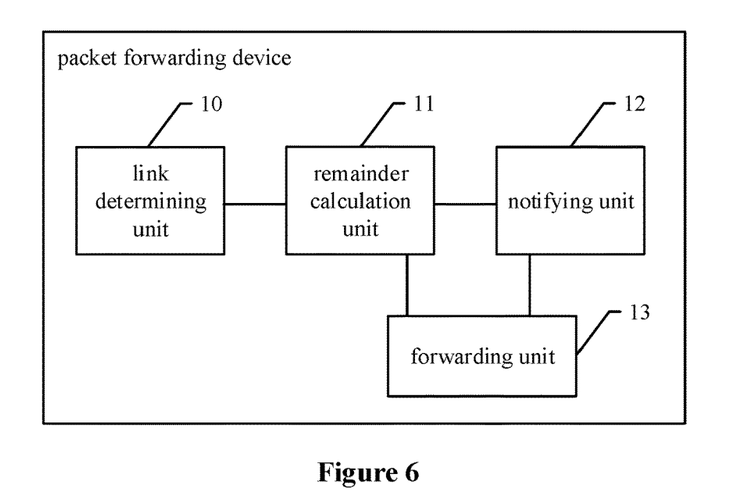
FIG. 6 is a schematic structural diagram of a packet forwarding device according to an embodiment of the present application.

A packet forwarding device is further provided according to an embodiment of the present application, i.e., the communication device 1. The device according to the embodiment may forward a packet according to the flowcharts shown in FIG. 2a or FIG. 2b. FIG. 6 is a schematic structural diagram of the device, which includes the follows.

The link determining unit 10 is configured to determine that a total number of links N is an integral power of 2, where the total number of links is a sum of a number of added virtual link and a number of actual links for forwarding a data packet. The link determining unit 10 may add P virtual link based on the actual links, such that a sum of the number of virtual link P and the number of actual links M is an integral power of 2. In order to facilitate subsequent calculation, the actual links and the virtual link may be numbered. For example, from the actual links to the virtual link, the links are numbered as 0, 1, 2, . . . , and N−1.

The remainder calculation unit 11 is configured to calculate a hash value of the data packet and calculate a remainder of the hash value divided by the total number of links, where the total number of links is determined by the link determining unit 10. In a process of calculating the hash value, the remainder calculation unit may extract a part of fields from the data packet, and perform cyclic redundancy check on a byte sequence formed by the extracted part of fields to calculate the hash value.

The notifying unit 12 is configured to notify the remainder calculation unit 11 of a calculation of another hash value of the data packet and of a calculation of the remainder based on the another hash value, if a remainder of a hash value divided by the total number of links obtained by the remainder calculation unit 11 corresponds to a virtual link. Specifically, the remainder calculation unit 11 is notified to calculate a remainder of the another hash value divided by the total number of links.

The forwarding unit 13 is configured to forward the data packet on an actual link, when the remainder calculation unit 11 and the notifying unit 12 perform the above operations cyclically until a remainder of a hash value of the data packet is divided by a decreased total number of links corresponds to an actual link. The forwarding unit 13 is further configured to forward the data packet on the actual link, if the remainder of the hash value divided by the total number of links obtained by the remainder calculation unit 11 corresponds to the actual link.

Alternatively, in other specific embodiments, the notifying unit 12 is configured to notify that the remainder calculation unit 11 calculates a remainder of the hash value divided by a number of actual links of the data packet, if a remainder of a hash value divided by the total number of links obtained by the remainder calculation unit 11 corresponds to a virtual link. In this case, the forwarding unit 13 is configured to forward the data packet on an actual link corresponding to the remainder of the hash value divided by the number of the actual links, where the remainder is obtained by the remainder calculation unit 11. In this case, the hash value for calculating the remainder of actual links may be the same as or different from the hash value for calculating the remainder of the total number of links.

In another specific embodiment, in order to avoid the notifying unit 12 and the forwarding unit 13 from recurrently performing step 101 to step 104 too many times, if the remainder of the hash value divided by the total number of links still corresponds to the virtual link after the times of a cycle operation of the notifying unit 12 and the forwarding unit 13 from step 101 to step 104 exceeds a preset value, the notifying unit 12 and the forwarding unit 13 may continue to perform step 105.

In the embodiment, the communication device may add virtual links and calculates the remainder, such that the data packet can finally be forwarded in a certain actual link and the data packets can be uniformly distributed to actual links as much as possible, and thereby distributing the traffic uniformly and reducing the influence on a service.

Figure 7:
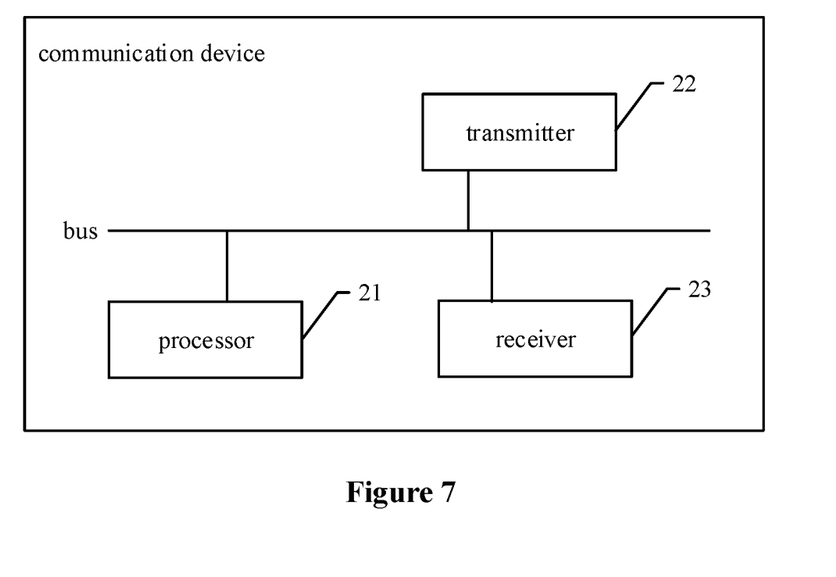
FIG. 7 is a schematic structural diagram of a communication device according to an embodiment of the present application.

A communication device is further provided according to an embodiment of the present application. The device according to the embodiment may forward a data packet according to the flowcharts shown in FIG. 2; and a schematic structural diagram thereof is shown in FIG. 7. The communication device includes a processor 21, a transmitter 22 and a receiver 23 which are connected to a bus. The communication device may further include a memory.

The memory is used to store data received from the transmitter 22, and store information such as a necessary file for processing data by the processor 21. The transmitter 22 and the receiver 23 are ports, by which the communication device communicates with other devices.

The processor 21 is configured to determine that a total number of links N is an integral power of 2, when the receiver 23 receives a data packet, where the total number of links is a sum of the number of added virtual link and the number of actual links for forwarding the data packet; calculate a hash value of the data packet; calculate a remainder of the hash value divided by the total number of links; if the remainder of the hash value divided by the total number of links corresponds to a virtual link, calculate another hash value of the data packet and calculate a remainder based on the another hash value, specifically, calculate a remainder of the another hash value divided by the total number of links, perform the above operations cyclically until a remainder of a hash value of the data packet divided by a decreased total number of links corresponds to an actual link; and notify the transmitter 22 to forward the data packet on the actual link. Alternatively, if the remainder of the hash value divided by the total number of links corresponds to a virtual link, the processor 21 is configured to calculate a remainder of the hash value divided by a number of actual links of the data packet and notify the transmitter 22 to forward the data packet on an actual link corresponding to the remainder of the hash value divided by the number of the actual links. In this case, the hash value for calculating the remainder of the number of actual links may be the same as or different from the hash value for calculating the remainder of the total number of links.

The processor 21 is further configured to, if the remainder of the hash value divided by the total number of links corresponds to an actual link, notify the transmitter 22 to forward the data packet on the actual link. In this way, virtual links may be added and the remainder is calculated, such that the data packet can finally be forwarded in a certain actual link and the data packets can be uniformly distributed to actual links as much as possible, and thereby distributing the traffic uniformly and reducing the influence on a service.

The processor 21 may add P virtual link based on the actual links, such that a sum of the number P of the virtual link and the number M of the actual links is an integral power of 2. In order to facilitate subsequent calculation, the actual links and the virtual link may be numbered. For example, from the actual links to the virtual link, the links are numbered as 0, 1, 2, . . . , and N−1. In a process of calculating the hash value, the processor 21 may extract a part of field from the data packet; and perform cyclic redundancy check on a byte sequence formed by the extracted part of fields, to calculate the hash value.

Another packet forwarding device is further provided according to an embodiment of the present application, i.e., the communication device 1. The device according to the embodiment may forward a packet according to the flowchart shown in FIG. 4; and a schematic structural diagram thereof is similar to FIG. 6. The packet forwarding device includes the follows.

The link determining unit is configured to determine that a total number N of links is an integral power of 2, where the total number of links is a sum of a number of added virtual link and a number of virtual sublinks formed by extending actual links for forwarding a data packet.

The link determining unit may determine a number of virtual sublinks formed by extending each actual link for forwarding the data packet, before determining the total number of links; multiply the determined number of virtual sublinks by the number of actual links to obtain a product, and determine an adding value which is added to the product to obtain an integral power of 2; if the adding value is less than a preset value, use the adding value as the number of virtual link to be added, and determine the total number of links as a sum of the product and the adding value; and if the adding value is greater than a preset value, determine another number of virtual sublinks to be formed by extending each actual link and determine an adding value for the another number of the virtual sublinks.

The link determining unit may extend each of the multiple actual links for forwarding the data packet onto multiple virtual sublinks, for example each of the multiple actual links is extended into three virtual sublinks, and then add P virtual link based on these virtual sublinks, such that a sum of the number of virtual sublinks formed by extending all the actual links (i.e., the number of all virtual sublinks) and the number of virtual link is an integral power of 2. In order to facilitate subsequent calculation, the link determining unit may number the virtual sublinks of the actual links and the virtual link. For example, from the virtual sublinks of the actual links to the virtual link, the links are numbered as 0, 1, 2, . . . , and N−1; and the actual links may be numbered from 0 to M−1.

The remainder calculation unit is configured to calculate a hash value of the data packet and calculate a remainder of the hash value divided by the total number of links, where the total number of links is determined by the link determining unit. Specifically, the remainder calculation unit is configured to extract a part of fields from the data packet; and perform cyclic redundancy check on a byte sequence formed by the extracted part of fields, to calculate the hash value.

The notifying unit is configured to notify the remainder calculation unit of a calculation of another hash value of the data packet and of a calculation of a remainder calculation based on the another hash value, if the remainder, obtained by the remainder calculation unit, of the hash value divided by the total number of links corresponds to a virtual link. That is, the remainder calculation unit may calculate a remainder of the another hash value divided by a decreased total number of links.

The forwarding unit is configured to forward the data packet on an actual link, when the remainder calculation unit and the notifying unit perform the above operations cyclically until a remainder of a hash value of the data packet divided by a decreased total number of links corresponds to a certain virtual sublink of the actual link.

The forwarding unit is further configured to if the remainder of the hash value divided by the total number of links corresponds to a certain virtual subunit, forward the data packet on an actual link corresponding to the certain virtual sublink, where the remainder is obtained by the remainder calculation unit.

Alternatively, in a specific embodiment, the notifying unit is configured to notify the remainder calculation unit of a calculation of a remainder of the hash value of the data packet divided by the number of virtual sublinks, when the remainder, obtained by the remainder calculation unit, of the hash value divided by the number of links corresponds to a virtual link. In this case, the forwarding unit is configured to forward the data packet on an actual link extended to form a virtual sublink corresponding to the remainder of the hash value divided by the number of virtual sublinks, where the remainder is obtained by the remainder calculation unit. In this case, the hash value for calculating the remainder of the number of virtual sublinks may be the same as or different from the hash value for calculating the remainder of the total number of links.

In another specific embodiment, in order to avoid the notifying unit and the forwarding unit from performing step 201 to step 204 too many times, if the remainder of the hash value divided by the total number of links still corresponds to the virtual link after the times of a cycle operation of the notifying unit 12 and the forwarding unit 13 from step 101 to step 104 exceeds a preset value, the notifying unit and the forwarding unit may continue to perform step 205.

If the remainder corresponds to a certain virtual sublink, in a process of determining an actual link corresponding to the virtual sublink, the forwarding unit may divide the remainder obtained by the remainder calculation unit by the number of virtual sublinks formed by extending one actual link, to obtain a quotient; and an integral part of the quotient may correspond to an actual link number, and thereby obtaining the actual link corresponding to the virtual sublink.

In the embodiment, the communication device may extend the actual links, add the a virtual link and calculate the remainder, such that the data packet can finally be forwarded in a certain actual link and the data packets can be uniformly distributed to actual links as much as possible, and thereby distributing the traffic uniformly, reducing the influence on a service. In addition, with the method, less virtual links are added.

A communication device is further provided according to an embodiment of the present application. The device according to the embodiment may forward a packet according to the flowchart shown in FIG. 4; and a schematic diagram thereof is similar to FIG. 7. The communication device includes a processor, a transmitter and a receiver, which are connected to a bus. In addition, the communication device may further include a memory.

The memory is used to store data received from the transmitter, and store information such as a necessary file for processing data by the processor. The transmitter and the receiver are ports, by which the communication device communicates with other devices.

The processor is configured to determine that a total number N of links is an integral power of 2 when the transmitter receives a data packet, where the total number of links is a sum of the number of virtual sublinks formed by extending actual links for forwarding the data packet and the number of added virtual link; calculate a hash value of the data packet, and calculate a remainder of the hash value divided by the total number of links; if the remainder of the hash value divided by the total number of links corresponds to a virtual link, calculate another hash value of the data packet and perform the remainder calculation based on the another hash value, i.e., calculate a remainder of the another hash value divided by the total number of links; perform the above operations cyclically, until a remainder of a hash value of the data packet divided by a decreased total number of links corresponds to a certain virtual sublink of the actual link; and notify the transmitter to forward the data packet on the actual link. Alternatively, in another specific embodiment, the processor is configured to calculate a remainder of the hash value of the data packet divided by the number of virtual sublinks if the remainder of the hash value divided by the total number of links corresponds to a virtual link; and notify the transmitter to forward the data packet on an actual link extended to form the virtual sublink corresponding to the remainder of the hash value divided by the number of virtual sublinks. In this case, the hash value for calculating the remainder against the number of virtual sublinks may be the same as or different from the hash value for calculating the remainder against the total number of links.

The processor is further configured to directly notify the transmitter to forward the data packet on an actual link corresponding to a certain virtual sublink, if the remainder of the hash value divided by the total number of links corresponds to the certain virtual sublink. In this way, the actual links are extended, the virtual links are added and the remainder is calculated, such that the data packet can finally be forwarded in a certain actual link and the data packets can be uniformly distributed to the actual links as much as possible, and thereby distributing the traffic uniformly, reducing the influence on a service. In addition, with this method, less virtual links are added.

The processor may determine the number of virtual sublinks to be formed by extending one of actual links for forwarding the data packet, before determining the total number of links; multiply the determined number of virtual sublinks by the number of actual links to obtain a product, and determine an adding value which is added to the product to obtain an integral power of 2; if the adding value is less than a preset value, use the adding value as the number of virtual links to be added, and determine that the total number of links is a sum of the product and the adding value; if the adding value is greater than the preset value, determine another number of virtual sublinks to be formed by extending one of actual link, and determine an adding value for the other number of the virtual sublinks.

In determining the total number of links, the processor may extend each of multiple actual links for forwarding a data packet onto multiple virtual sublinks, for example each of the multiple actual links is extended into 3 virtual sublinks; and then add P virtual link based on the virtual sublinks, such that a sum of the number of virtual sublinks formed by extending all the actual links (i.e., the number of all the virtual sublinks) and the number of the virtual link is an integral power of 2. In order to facilitate subsequent calculation, the link determining unit may number the virtual sublinks formed by extending the actual links and the virtual link. For example, from the virtual sublinks formed by extending the actual links to the virtual link, the links are numbered as 0, 1, 2, . . . , and N−1; and the actual links are numbered from 0 to M−1. In calculating the hash value, the processor may extract a part of field from the data packet; and perform cyclic redundancy check on a byte sequence formed by the extracted part of fields, to calculate the hash value, when the remainder corresponds to a certain virtual sublink, in a process of determining an actual link extended to form the certain virtual sublink, the processor may divide the remainder, obtained by the remainder calculation unit, by the number of virtual sublinks formed by extending one actual link, to obtain a quotient; and an integral part of the quotient may correspond to the number of a certain actual link, and thereby obtaining the actual link corresponding to the virtual sublink.

A packet forwarding system is further provided according to an embodiment of the present application. A schematic structural diagram of the packet forwarding system is shown in FIG. 1b. The packet forwarding system includes a first communication device (i.e., the communication device 1) and a second communication device (i.e., the communication device 2). There are multiple actual links configured to forward a data packet between the first communication device and the second communication device. The first communication device has the same structure as the data packet forwarding device or the communication device according to the above device embodiments, which is not described herein.

Another packet forwarding system is further provided according to an embodiment of the present application. A schematic structural diagram of the packet forwarding system is show in FIG. 1a. The packet forwarding system includes a first communication device (i.e., the communication device 1) and multiple second communication devices (i.e., the communication devices 21 to 2m). There is an actual link configured to forward a data packet between the first communication device and each of the multiple second communication devices. The first communication device has the same structure as the data packet forwarding device or the communication device according to the above device embodiments, which is not described herein.

Those skilled in the art may understand that all or a part of steps of the method according to the above embodiments may be performed by related hardware instructed by programs. The programs may be stored in a computer readable storage medium, for example a read only memory (ROM), a random access memory (RAM), a magnetic disk or an optical disk.

The packet forwarding method, the packet forwarding system and the packet forwarding device according to the embodiments of the present application are described in detail above. The principles and implementing manners of the present application are clarified using specific embodiments, and the description of the embodiments is only intended to understand the methods of the present application and the key concept thereof. In addition, those skilled in the art may change the specific implementing manners and the application range according to the concept of the present application. In summary, the specification is not intended to limit the present application.

What is claimed is:

1. A packet forwarding method comprising:
   determining a number of added virtual links to make a total number of links an integral power of 2, wherein the total number of links is a sum of the number of added virtual links and a number of actual links for forwarding a data packet;
   determining a hash value of the data packet by performing a first hash algorithm on a first field of the data packet, and determining a first remainder of the hash value divided by the total number of links; and
   if the first remainder of the hash value divided by the total number of links corresponds to a virtual link, performing one of following (1) and (2):
   1. repeating the determination of the hash value of the data packet using a second hash algorithm different from the first hash algorithm or by performing the first hash algorithm on a different field of the data packet until the first remainder of the hash value divided by the total number of links of the data packet corresponds to an actual link, and forwarding the data packet on the actual link; or
   2. determining a second remainder of the hash value divided by the number of actual links, and forwarding the data packet on an actual link corresponding to the second remainder; or
   if the first remainder of the hash value divided by the total number of links corresponds to an actual link, forwarding the data packet on the actual link.

2. The method according to claim 1, wherein the determining a hash value of the data packet comprises:
   extracting a plurality of fields from the data packet; and performing cyclic redundancy check on a byte sequence formed by the extracted fields, to calculate the hash value.

3. A packet forwarding method comprising:
determining a number of added virtual links of a data packet to make a total number of links an integral power of 2, wherein the total number of links is a sum of a number of added virtual link and a number of virtual sublinks formed by extending actual links for forwarding a data packet;
determining a hash value of the data packet by performing a first hash algorithm on a field of the data packet, and determining a first remainder of the hash value divided by the total number of links; and
if the first remainder of the hash value divided by the total number of links corresponds to a virtual link, performing one of following (1) and (2):
  1. repeating the determination of the hash value using a second hash algorithm different from the first hash algorithm or by performing the first hash algorithm on a different field of the data packet until the first remainder of the hash value divided by the total number of links of the data packet corresponds to one of virtual sublinks of an actual link, and forwarding the data packet on the actual link; or
  2. determining a second remainder of the hash value of the data packet divided by the number of virtual sublinks, and forwarding the data packet on an actual link extended to form a virtual sublink corresponding to the second remainder.

4. The method according to claim 3, further comprising:
if the first remainder of the hash value divided by the total number of links corresponds to one of the virtual sublinks, forwarding the data packet on the actual link extended to form the one of the virtual sublinks.

5. The method according to claim 3, wherein before determining the number of added virtual links of the data packet to make the total number of links an integral power of 2, the method further comprises:
determining a number of virtual sublinks to be formed by extending each of the actual links for forwarding the data packet;
multiplying the determined number of the virtual sublinks by the number of the actual links to obtain a product, and determining an adding value which is added to the product to obtain an integral power of 2;
if the adding value is less than a preset value, using the adding value as the number of virtual links to be added; and
if the adding value is greater than a preset value, determining another number of virtual sublinks to be formed by extending each of the actual links and determining an adding value for the another number of virtual sublinks,
wherein the total number of links is a sum of the product and the adding value.

6. The method according to claim 4, wherein before determining the number of added virtual links of the data packet to make the total number of links an integral power of 2, the method further comprises:
determining a number of virtual sublinks to be formed by extending each of the actual links for forwarding the data packet;
multiplying the determined number of the virtual sublinks by the number of the actual links to obtain a product, and determining an adding value which is added to the product to obtain an integral power of 2; and
if the adding value is less than a preset value, using the adding value as the number of virtual links to be added;
if the adding value is greater than a preset value, determining another number of virtual sublinks to be formed by extending each of the actual links and determining an adding value for the another number of virtual sublinks,
wherein the total number of links is a sum of the product and the adding value.

7. The method according to claim 3, wherein the determining a hash value of the data packet comprises:
extracting a plurality of fields from the data packet; and
performing cyclic redundancy check on a byte sequence formed by the extracted fields, to calculate the hash value.

8. The method according to claim 4, wherein the determining a hash value of the data packet comprises:
extracting a plurality of fields from the data packet; and
performing cyclic redundancy check on a byte sequence formed by the extracted fields, to calculate the hash value.

9. A packet forwarding device comprising a processor and a transceiver, wherein:
the processor is configured to determine a number of added virtual links to make a total number of links in a data packet an integral power of 2, wherein the total number of links is a sum of the number of the added virtual links and a number of actual links for forwarding the data packet;
the processor is further configured to determine a hash value of the data packet by performing a first hash algorithm on a first field of the data packet, and determining a first remainder of the hash value divided by the total number of links; and
if the first remainder corresponds to a virtual link, the processor is further configured to perform one of following (1) and (2):
  1. repeating the determination of the hash value of the data packet using a second hash algorithm different from the first hash algorithm or by performing the first hash algorithm on a different field of the data packet until the first remainder of the hash value divided by the total number of links of the data packet corresponds to an actual link; or
  2. determining an actual link corresponding to a second remainder of the hash value divided by the number of the actual links of the data packet; and
the transceiver is further configured to forward the data packet on the actual link after the processor determines the actual link by performing one of above (1) and (2);
if the first remainder corresponds to an actual link, the transceiver is further configured to forward the data packet on the actual link.

10. The device according to claim 9, wherein the processor is configured to extract a plurality of fields from the data packet; and perform cyclic redundancy check on a byte sequence formed by the extracted fields, to calculate the hash value.

11. A packet forwarding device comprising a processor and a transceiver, wherein:
the processor is configured to determine a number of added virtual links to make a total number of links an integral power of 2, wherein the total number of links is a sum of the number of the added virtual links and a number of virtual sublinks formed by extending actual links for forwarding a data packet;

the processor is further configured to determine a hash value of the data packet by performing a first hash algorithm on a field of the data packet and calculate a first remainder of the hash value divided by the total number of links; and if the first remainder corresponds to a virtual link, the processor is configured to perform one of following (1) and (2):

1. repeating the determination of the hash value of the data packet using a second hash algorithm different from the first hash algorithm or by performing the first hash algorithm on a different field of the data packet until the first remainder of the hash value divided by the total number of links of the data packet corresponds to one of the virtual sublinks of an actual link; or 2. the processor is configured to determine an actual link corresponding to a second remainder of the hash value of the data packet divided by the number of virtual sublinks; and the transceiver is configured to forward the data packet on the actual link.

12. The device according to claim 11, wherein the transceiver is further configured to forward the data packet on an actual link corresponding to one of the virtual sublinks, if the first remainder, obtained by the processor, of the hash value divided by the total number of links corresponds to the one of the virtual sublinks.

13. The device according to claim 11, wherein the processor is further configured to determine the number of virtual sublinks to be formed by extending each of the actual links for forwarding the data packet;

multiply the determined number of the virtual sublinks by the number of actual links to obtain a product;

determine an adding value which is added to the product to obtain an integral power of 2; and if the adding value is less than a preset value, use the adding value as the number of virtual links to be added and determine that the total number of links is a sum of the product and the adding value; or if the adding value is greater than a preset value, return back to a determination of another number of virtual sublinks to be formed by extending each of the actual links and determine the adding value for the other number of the virtual sublinks.

14. The device according to claim 12, wherein the processor is further configured to determine the number of virtual sublinks to be formed by extending each of the actual links for forwarding the data packet;

multiply the determined number of the virtual sublinks by the number of actual links to obtain a product, and determine an adding value which is added to the product to obtain an integral power of 2; and if the adding value is less than a preset value, use the adding value as the number of virtual links to be added and determine that the total number of links is a sum of the product and the adding value;

if the adding value is greater than a preset value, return back to a determination of another number of virtual sublinks to be formed by extending each of the actual links and determine the adding value for the other number of the virtual sublinks.

15. The device according to claim 11, wherein the processor is configured to extract a plurality of fields from the data packet; and perform cyclic redundancy check on a byte sequence formed by the extracted fields, to calculate the hash value.

16. The device according to claim 12, wherein the processor is configured to extract a plurality of fields from the data packet; and perform cyclic redundancy check on a byte sequence formed by the extracted fields, to calculate the hash value.

* * * * *